Figure 1:
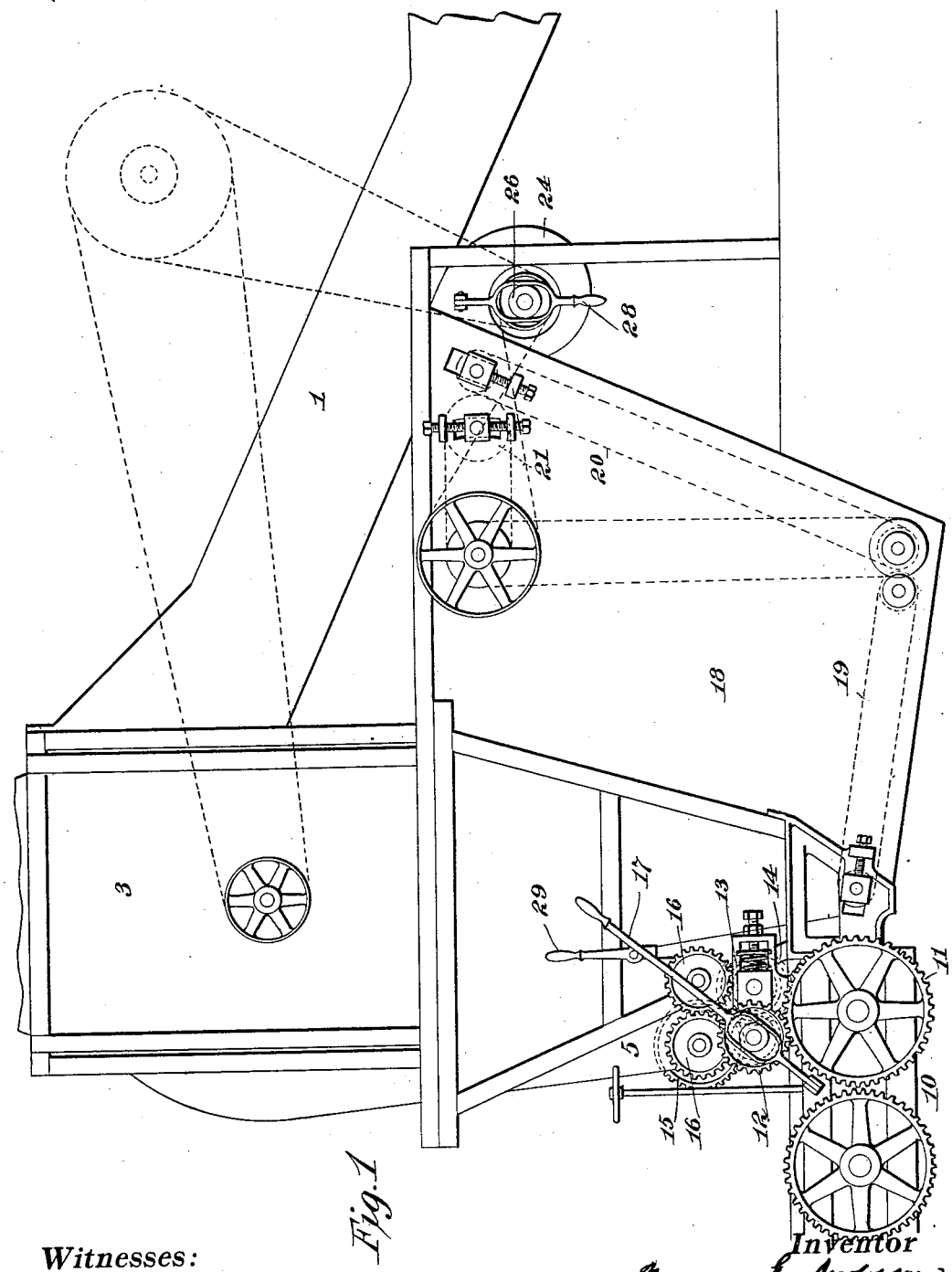

No. 676,597. Patented June 18, 1901.
W. E. ANDERSON.
APPARATUS FOR MAKING COTTON BALES.
(Application filed Mar. 30, 1900.)
(No Model.) 2 Sheets—Sheet 1.

Witnesses:
Jas. F. Coleman
Archibald G. Reeve

Inventor
William E. Anderson
by Frank L. Dyer
Att'y.

No. 676,597. Patented June 18, 1901.
W. E. ANDERSON.
APPARATUS FOR MAKING COTTON BALES.
(Application filed Mar. 30, 1900.)
(No Model.) 2 Sheets—Sheet 2.
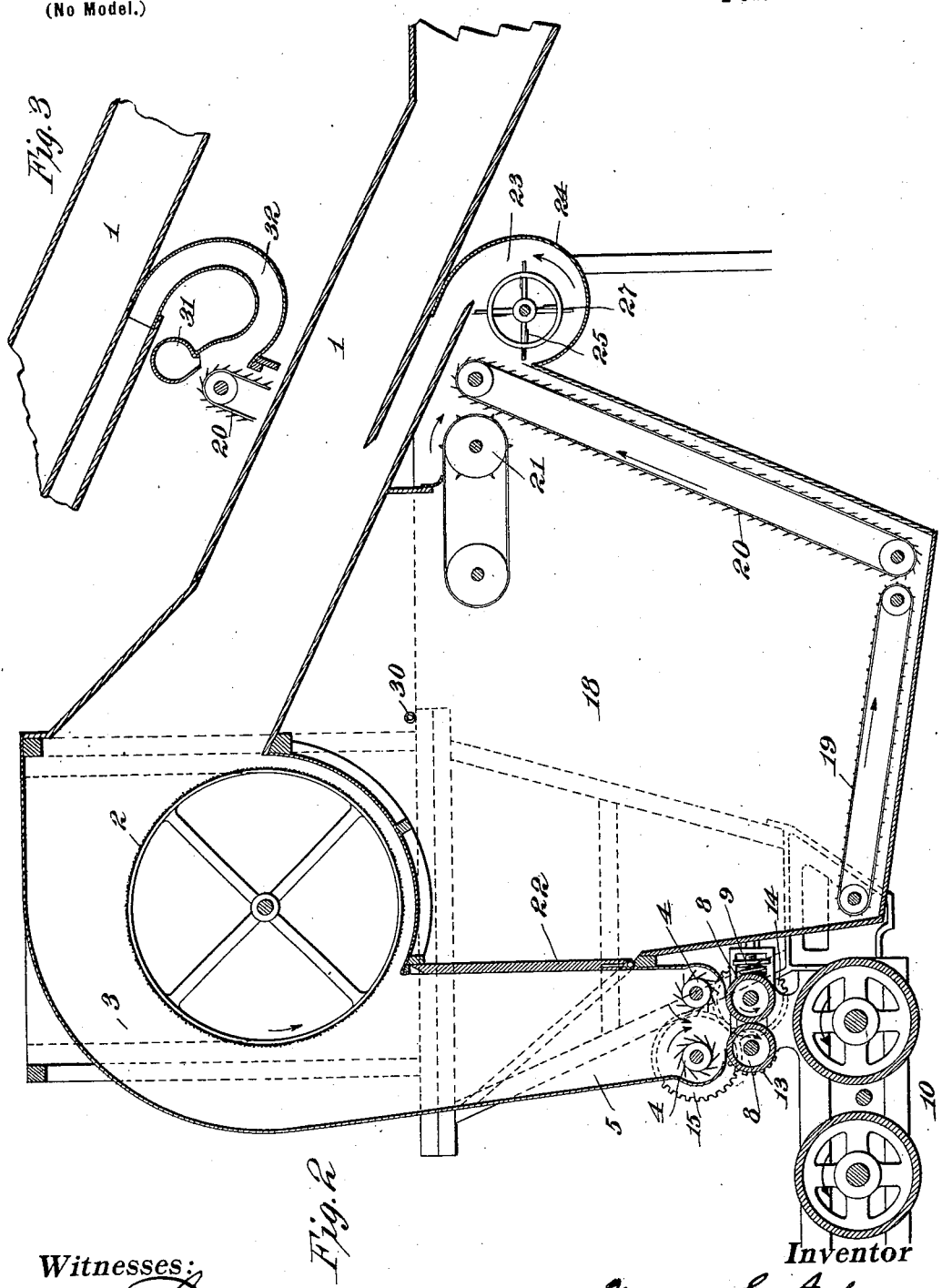
Witnesses:
Inventor
William E. Anderson
by Frank L. Ayer
Att'y

UNITED STATES PATENT OFFICE.

WILLIAM E. ANDERSON, OF HOUSTON, TEXAS, ASSIGNOR TO THE AMERICAN COTTON COMPANY, OF NEW YORK, N. Y.

APPARATUS FOR MAKING COTTON-BALES.

SPECIFICATION forming part of Letters Patent No. 676,597, dated June 18, 1901.

Application filed March 30, 1900. Serial No. 10,720. (No model.)

*To all whom it may concern:*

Be it known that I, WILLIAM E. ANDERSON, a citizen of the United States, residing in the city of Houston, county of Harris and State of Texas, have invented certain new and useful Improvements in Apparatus for Making Cotton-Bales, of which the following is a specification.

My invention relates to improvements in apparatus for making cotton-bales from approximately continuous sheets or bats, and the invention is particularly adapted for use in connection with devices of this type wherein the sheet or bat is convolutionally wound under pressure to form a cylindrical bale.

In the operation of devices for making cotton-bales from approximately continuous sheets or bats, and particularly in the manufacture of cylindrical cotton-bales, it has been found desirable to operate the ginning and bat-forming devices continuously in order to secure the best results and to prevent the loss of time which would be incurred if such devices were stopped during the times that the finished bales are being covered or bound and removed from the baling devices. In order that this object may be effected, it is the practice in the operation of cylindrical baling-presses and it has also been suggested in connection with other presses for making bales from approximately continuous sheets or bats to employ a continuously-operating bat-forming device from which an approximately continuous sheet or bat is alternately fed to two sets of baling devices whereby when a finished bale is being covered or tied and removed from one of said devices a new bale may be started in the other. It has also been suggested to employ two presses for making cylindrical bales of cotton, each having a separate bat-forming device whereby after the bale has been finished in one and is being covered or bound and removed therefrom a new bale may be started in the other by directing the cotton to its bat-former from the ginning apparatus. The principal objections to either form of apparatus referred to are that the employment of two presses or other baling devices is expensive, the apparatus is necessarily bulky, and in the case of cylindrical baling-presses sufficient power must be available to operate both presses simultaneously, one press starting the formation of a new bale and the other press applying the cover to and removing the finished bale. In order to accomplish this object, it has also been suggested to employ a device between the condenser or other bat-former and the press for accumulating the cotton during the time that the finished bale is being covered and removed from the press; but the principal objections to such devices have been the difficulty in properly accumulating cotton and of feeding the cotton back from the accumulator to the press.

My invention, in the first place, provides a simple, cheap, relatively compact, and highly efficient apparatus employing only a single press and which permits the ginning and bat-forming devices to be operated continuously, which accumulates the cotton in light and fleecy condition during the covering and removal of the bales, and which feeds the cotton from the accumulator to the baling apparatus whenever this is desired.

In the operation of presses for making cylindrical cotton-bales employing two baling-rolls mounted in the same horizontal plane, one carried in fixed bearings and the other in bodily-removable bearings to which pressure is applied and with an endless belt passing over both baling-rolls and beneath the core, it has been found that the bat or sheet when unwound presents variations in weight, even though it were of uniform weight when fed to the press. Generally speaking, this variation may be regarded as a gradual falling off in weight from the center upward. This variation in the weight of the sheet or bat of which the bale is formed is due to imperfect action of the baling device, which it has thus far been impossible to overcome in practice. Variations in the weight of the sheet or bat incident to cotton-bales are objectionable, first, because they prevent the securing of a maximum quantity of cotton in a minimum bulk, as is possible with a uniform weight of bat per yard, and, second, because they require the bales to be passed through opening-machines at the mills to be formed into a uniform bat suitable for carding.

A second object of my invention is to provide an apparatus wherein greater uniformity in the weight of the sheet or bat of which the bale is made can be obtained than now appears to be possible in practice.

Broadly stated, my invention comprises a single baling apparatus of any type adapted to form an approximately continuous sheet or bat into a bale; a condenser-cylinder or other device for separating the air from the cotton coming from the gins; a suitable device coöperating either directly or indirectly with the condenser-cylinder or its equivalent for forming the cotton into a sheet or bat; an accumulating device located out of the normal path of the cotton passing from the gins to the press, but adapted to receive the cotton from the condenser-cylinder or its equivalent, and to thereby divert it from the bat-forming devices when desired, and means for properly feeding the cotton from within the accumulator to the bat-forming devices when desired. Preferably the accumulator which I use is analogous to automatic feeders well known in the art of cotton manufacture, said automatic feeders being provided with a movable bottom, a spiked feed-apron at one side for removing the cotton therefrom, and an adjustable evener belt or roller coöperating with the feed-apron for keeping uniform the cotton removed by the latter. When an accumulator of this form is employed, I make use of a gate or flap which is normally closed, but which may be opened to divert the cotton from the condenser-cylinder or its equivalent into the accumulator. Preferably the cotton accumulated in the accumulator is removed therefrom and returned to the condenser-cylinder or its equivalent, whereby the accumulated cotton will be more evenly distributed for its formation into a bat than if it were passed directly from the accumulator into the bat-former. By employing an apparatus having an accumulator in which cotton may be accumulated in light fluffy condition during the time the bale is being covered and removed, which accumulator is removed from the normal path of the cotton coming from the gins to the press, the cotton within the accumulator may be removed therefrom and passed to the forming bale at any time that may be desired. It therefore becomes possible with this device to so add the accumulated cotton from the accumulator to the cotton passing directly from the gins to the bat-former as to form a bat, which when wound up in a cylindrical bale will be more nearly uniform in weight than is now the case, whereby the resulting bales will more nearly approximate the ideal conditions.

In order that my invention may be better understood, attention is directed to the accompanying drawings, forming a part of this specification, and in which—

Figure 1 is a side view of an apparatus embodying the preferred construction of my invention, illustrating for the purpose of convenience a well-known type of cylindrical baling-press now in use; Fig. 2, a longitudinal sectional view of the same, and Fig. 3 a sectional view illustrating a modified arrangement for feeding the cotton to the gin-flue from the accumulator.

In all of the above views corresponding parts are represented by the same numerals of reference.

1 represents the flue which leads from the ginning apparatus and along which the cotton is carried by air-blasts.

2 represents the device for separating the cotton from the blast by which it is carried and comprising, preferably, an ordinary perforated condenser-cylinder, the ends of which open into the flues 3 in the usual way, as shown.

4 4 represent a suitable bat-forming device, which in the present instance comprises the two rollers provided with metal teeth or pins carried in their peripheries, said rollers turning in opposite directions, as shown. The rollers 4 4 are placed near the bottom of a hopper 5, into which the cotton is delivered, preferably in a light fleecy condition. This may be effected by running the condenser-cylinder 2 at a high surface speed, so that the cotton blown thereon by the blast will be thrown off by the centrifugal effect. Mounted below the bat-forming rollers 4 4 is a pair of compression-rollers 8 8, held elastically together by the spring-buffers 9 or in any other way. The sheet or bat from the bat-former is fed between the compression-rollers 8 to any desired form of press. For convenience I have shown a press 10 of a well-known type, comprising a baling-roll mounted in stationary bearings, a second baling-roll mounted in movable bearings, a core between said rolls, and an endless belt passing over the baling-rolls and beneath the core. The compression-rollers 8 and the bat-forming rollers 4 may be driven in any suitable way. I show for this purpose a gear 11 on one of the baling-rolls driving a gear 12 on the shaft of one of the compression-rollers 8. The two compression-rollers are geared together by gears 13 at the other side of the machine, as shown in dotted lines, Fig. 1, and in full lines, Fig. 2. For the driving of the bat-forming rollers I illustrate a gear 14 on the shaft of one of the compression-rollers driving a gear 15 on the shaft of the diagonally-disposed bat-forming roller, and I show gears 16 16, meshing together and carried on the shafts of said bat-forming rollers. A clutch-lever 17 may be used operating any well-known form of clutch for unclutching the gear 12 when desired to stop the bat-forming rollers and compression-rollers.

The preferred form of accumulator comprises an automatic feeder 18 of a well-known type, having an endless belt 19 at its bottom and an endless spiked apron 20 at one side, with an adjustable evening device 21 for keeping uniform the quantity of cotton removed by the spiked apron in the usual way.

A gate or door 22 may be employed which normally cuts off the bat-forming devices from the accumulator, but which may be moved to the position shown in dotted lines to allow the cotton thrown off by the condenser-cylinder to be deposited in the accumulator.

From the accumulator the cotton may be returned to the bat-former in any suitable way and by any suitable means; but preferably this return is effected through the intermediation of the condenser-cylinder in order that the bat made in the bat-former will be entirely uniform and homogeneous. To this end I show as a convenient example of means a fan 23, mounted in the casing 24, leading into the flue 1, said fan being provided with blades 25, by which air will be drawn into the casing through side openings 26, as in ordinary centrifugals. I also show the fan as being provided with a series of gin-brushes 27, which act to sweep the cotton off of the spiked apron 20, so that it will be blown in the form of flakes through the flue 1 onto the condenser-cylinder 2. The belt 19, spiked apron 20, evener 21, and fan 23 or other device for removing the cotton from the accumulator are driven in any suitable way—as, for example, by means of belts, as illustrated in dotted lines. A clutch-lever 28 may be used for stopping the operation of the belt 19, spiked apron 20, and evener 21 when desired. A lever 29 may also be used for swinging the door or gate 22 between its extreme positions.

30 represents a steam-pipe leading within the accumulator and by means of which steam may be injected therein for extinguishing any fire which may become accidentally started.

In Fig. 3 a blast-pipe 31 is shown located adjacent to the spiked apron 20 for blowing the cotton from the apron through a pipe 32 into the gin-flue 1, which arrangement may be employed instead of the fan 23.

The operation of the specific embodiment of the invention described is as follows: Cotton from the ginning apparatus is blown through the flue 1 onto the condenser-cylinder, and the air escapes through the perforations in the suface thereof and out through the flues 3. By reason of the high surface speed of the condenser-cylinder the cotton will be thrown off and deposited in the hopper 5 in a light fluffy condition. From this hopper the cotton will be forced outward by the bat-forming rollers 4 in the form of a thick coherent and homogeneous bat, which will be compressed by the compression-rollers 8 and wound up in the press 10 in the usual way. The best results will be effected by arranging the gearing for the compression-rollers 8 so that they turn somewhat slower than the baling-rolls—say eighty-eight per cent. of the surface speed of the latter—and by arranging the gearing for the bat-forming rollers so that the effective surfaces of the latter move more slowly than the surfaces of the compression-rollers—say eighty-five per cent. of the latter—whereby the sheet or bat after it is formed in the bat-former will tend to be slightly elongated and reduced in thickness by the action of the compression-rollers and of the baling-rolls. After the bale has been finished in the press the gate or door 22 is moved to the position shown in dotted lines, Fig. 2, whereupon the cotton thrown off of the condenser-cylinder 2 will be deposited in the accumulator 18, the belt 19 and spiked apron 20 of the latter being stationary. The cotton will thus accumulate in the accumulator in a light and fluffy condition without material matting of the fibers thereof. During this accumulation of the cotton the compression-rollers 8 and bat-forming rollers 4 may be stopped, if desired, by operating the clutch-lever 17. After the bale has been covered and removed and a new core inserted in position the lever 29 is swung over to move the gate or door 22 to the position shown in full lines, whereupon the cotton from the condenser-cylinder will again be deposited in the hopper 5 and formed into a sheet or bat by the bat-forming rollers 4 to start the formation of a new bale. If desired, the belt 19 and spiked apron 20 may be now started by operating the clutch-lever 28, whereupon the cotton from within the accumulator will be removed therefrom in uniform quantity and be carried by the blast created by the fan 23 into the flue 1 and onto the condenser-cylinder, from which it is thrown by the centrifugal effect into the hopper 5. Thus the bat which will be formed during the time the cotton is being removed from the accumulator will be thicker than at other other times in the operation.

Since, as I have stated, in the operation of cylindrical baling-presses of the type described the weight of the sheet or bat tends to fall off more or less gradually from the start to the completion of the baling operation, it is desirable to withhold the return of the cotton accumulated within the accumulator to the bat-former until the bale has been about one-third completed and to apportion the speed and feed of the spiked apron 20, so that upon the starting up of the accumulator the latter will supply cotton to the bat-former throughout substantially the remainder of the bale. In this way I overcome, to a very great extent, the falling off in the weight of the sheet or bat and produce a bale which more nearly approximates the ideal conditions.

Having now described my invention, what I claim as new, and desire to secure by Letters Patent, is as follows:

1. In a cotton-baling apparatus, the combination with a baling device, a bat-forming device for producing a substantially continuous sheet or bat, and a device independent of the bat-former for separating the air from the ginned cotton and depositing the latter in the bat-former, of an accumulating device located out of the normal path of the cotton and in advance of the bat-former, means for permitting cotton to be deflected into the accumulator before reaching the bat-former, means for removing the cotton from the accumulator and means for feeding the same to the bat-former in a light and fluffy state, substantially as set forth.

2. In a cotton-baling apparatus, the combination with a baling device, a bat-forming device for producing a substantially continuous sheet or bat, a lint-flue, and a device in the lint-flue and independent of the bat-former for separating the air from the ginned cotton and depositing the latter in the bat-former, of an accumulating device located out of the normal path of the cotton and in advance of the bat-former, means for permitting cotton to be deflected into the accumulator before reaching the bat-former, means for removing the cotton from the accumulator and means for directing it by an auxiliary blast into the lint-flue, substantially as set forth.

3. In a cotton-baling apparatus, the combination with a baling apparatus, a bat-former for making a substantially continuous sheet or bat, a lint-flue through which the cotton is blown, and a condenser-cylinder interposed in the lint-flue for separating the blast from the cotton and for depositing the cotton in the bat-former, of an accumulator between the condenser-cylinder and the bat-former and normally out of the path of the cotton passing from the condenser-cylinder to the bat-former, means for directing the cotton from the condenser-cylinder into the accumulator, and means for returning the cotton from the accumulator to the bat-former in a light and fluffy state, substantially as set forth.

4. In a cotton-baling apparatus, the combination with a baling apparatus, a bat-former for making a substantially continuous sheet or bat, a lint-flue through which the cotton is blown, and a condenser-cylinder interposed in the lint-flue for separating the blast from the cotton and for depositing the cotton in the bat-former, of an accumulator between the condenser-cylinder and the bat-former and normally out of the path of the cotton passing from the condenser-cylinder to the bat-former, means for directing the cotton from the condenser-cylinder into the accumulator, means for removing the cotton from the accumulator and means for forcing it by an auxiliary blast to the condenser-cylinder, substantially as set forth.

5. In a cotton-baling apparatus, the combination with a baling apparatus, a bat-former for making a substantially continuous sheet or bat, a lint-flue through which the cotton is blown, and a device in the lint-flue for separating the blast from the cotton and for depositing the cotton in the bat-former, of an automatic feeder normally arranged out of the path of the cotton and in advance of the bat-former, said feeder being provided with a spiked apron for removing the cotton accumulated therein, means for directing the cotton into the automatic feeder before reaching the bat-former, means for removing the cotton from the automatic feeder and means for delivering the cotton to the bat-former in a light and fluffy state, substantially as set forth.

6. In a cotton-baling apparatus, the combination with a baling apparatus, a bat-former for making a substantially continuous sheet or bat, a lint-flue through which the cotton is blown, and a device in the lint-flue for separating the blast from the cotton and for depositing the cotton in the bat-former, of an automatic feeder normally arranged out of the path of the cotton and in advance of the bat-former, said feeder being provided with a spiked apron for removing the cotton accumulated therein, means for directing the cotton into the automatic feeder before reaching the bat-former, means for removing the cotton from the automatic feeder and means for returning the cotton by an auxiliary blast to the lint-flue, substantially as set forth.

7. In a cotton-baling apparatus, the combination with a baling apparatus, a bat-former for forming the cotton into an approximately continuous sheet or bat, a lint-flue through which the cotton is blown, and a condenser-cylinder in the lint-flue for separating the cotton from the air and for depositing the cotton in the bat-former, of an automatic feeder located between the condenser-cylinder and the bat-former and having a spiked feed-apron for removing the cotton deposited therein, means for directing the cotton from the condenser-cylinder into the automatic feeder, means for removing the cotton from the automatic feeder and means for delivering the cotton to the bat-former in a light and fluffy state, substantially as set forth.

8. In a cotton-baling apparatus, the combination with a baling apparatus, a bat-former for forming the cotton into an approximately continuous sheet or bat, a lint-flue through which the cotton is blown, and a condenser-cylinder in the lint-flue for separating the cotton from the air and for depositing the cotton in the bat-former, of an automatic feeder located between the condenser-cylinder and the bat-former and having a spiked feed-apron for removing the cotton deposited therein, means for directing the cotton from the condenser-cylinder into the automatic feeder, means for removing the cotton from the automatic feeder and means for returning the cotton to the condenser-cylinder by an auxiliary blast, substantially as set forth.

9. In a cotton-baling apparatus, the combination with a baling apparatus, a bat-former for making a substantially continuous sheet or bat, a lint-flue through which the cotton is blown, and a device in the lint-flue for separating the air from the cotton and for depositing the cotton in the bat-former, of an automatic feeder normally out of the path of the cotton passing from the lint-flue to the bat-former, means for deflecting the cotton into the automatic feeder before reaching the bat-former, and a fan for removing the cotton from the automatic feeder and returning it to the bat-former in a light and fluffy state, substantially as set forth.

10. In a cotton-baling apparatus, the combination with a baling apparatus, a bat-former for making a substantially continuous sheet or bat, a lint-flue through which the cotton is blown, and a device in the lint-flue for separating the blast from the cotton and for depositing the cotton in the bat-former, of an automatic feeder normally out of the path of the cotton passing from the lint-flue to the bat-former, means for deflecting the cotton into the automatic feeder before reaching the bat-former, and a fan for removing the cotton from the automatic feeder, the discharge from said fan connecting with the lint-flue, substantially as set forth.

11. In a cotton-baling apparatus, the combination with a baling apparatus, a bat-former for making a substantially continuous sheet or bat, a lint-flue through which the cotton is blown, and a condenser-cylinder mounted in the lint-flue for separating the air from the cotton and for depositing the cotton in the bat-former, of an automatic feeder located between the condenser-cylinder and the bat-former, means for deflecting the cotton from the condenser-cylinder into the bat-former, and a fan for removing the cotton from the automatic feeder and returning it to the bat-former in a light and fluffy state, substantially as set forth.

12. In a cotton-baling apparatus, the combination with a baling apparatus, a bat-former for making a substantially continuous sheet or bat, a lint-flue through which the cotton is blown, and a condenser-cylinder mounted in the lint-flue for separating the blast from the cotton and for depositing the cotton in the bat-former, of an automatic feeder located between the condenser-cylinder and the bat-former, means for deflecting the cotton from the condenser-cylinder into the bat-former, and a fan for removing the cotton from the automatic feeder, the discharge from said fan leading into the lint-flue, substantially as set forth.

13. In a cotton-baling apparatus, the combination with a press for making cylindrical cotton-bales, a bat-forming device for making a substantially continuous sheet or bat and for feeding said sheet or bat to the press, a lint-flue through which the cotton is blown, and a device for separating the blast from the cotton and for depositing the cotton in the bat-former, of an accumulator placed normally outside of the path of the cotton passing to the bat-former, means for deflecting the cotton into the accumulator, means for discharging it from the accumulator in a light, fluffy state, and means for removing the cotton from the accumulator and for delivering it to the bat-former when desired, substantially as set forth.

14. In a cotton-baling apparatus, the combination with a press for making cylindrical cotton-bales, a bat-forming device for making a substantially continuous sheet or bat and for feeding said sheet or bat to the press, a lint-flue through which the cotton is blown, and a device for separating the blast from the cotton and for depositing the cotton in the bat-former, of an accumulator placed normally outside of the path of the cotton passing to the bat-former, means for deflecting the cotton into the accumulator, means for discharging it from the accumulator in a light, fluffy state, and means for removing the cotton from the accumulator and returning it to the lint-flue when desired, substantially as set forth.

15. In a cotton-baling apparatus, the combination with a press for making cylindrical cotton-bales, a bat-forming device for making a substantially continuous sheet or bat which is fed to the press, a lint-flue through which the cotton is blown, and a condenser-cylinder mounted in said lint-flue for separating the blast from the cotton and for depositing the cotton in the bat-former, of an accumulator located between the condenser-cylinder and bat-former, means for deflecting the cotton when desired into said accumulator from the condenser-cylinder, and a fan for removing the cotton from the accumulator and blowing it by an auxiliary blast onto the condenser-cylinder, substantially as set forth.

16. In a cotton-baling apparatus, the combination with a press for making cylindrical cotton-bales, a bat-former for making a substantially continuous sheet or bat which is fed to the press, a lint-flue through which the cotton is blown, and a condenser-cylinder in the lint-flue for separating the cotton from the air and for depositing the cotton in the bat-former, of an automatic feeder placed between the condenser-cylinder and the bat-former and having a feed-apron for removing the cotton therefrom, a gate or door arranged to be moved into the path of the cotton thrown off of the condenser-cylinder, whereby such cotton will accumulate in the automatic feeder, means for removing the cotton from the automatic feeder and means for delivering it to the bat-former in a light and fluffy state, substantially as set forth.

17. In a cotton-baling apparatus, the combination with a press for making cylindrical cotton-bales, a bat-former for making a substantially continuous sheet or bat which is fed to the press, a lint-flue through which the cotton is blown, and a condenser-cylinder in the lint-flue for separating the cotton from the air and for depositing the cotton in the bat-former, of an automatic feeder placed between the condenser-cylinder and the bat-former and having a feed-apron for removing the cotton therefrom, a gate or door arranged to be moved into the path of the cotton thrown off of the condenser-cylinder, whereby such cotton will accumulate in the automatic feeder, and a fan for removing the cotton from the automatic feeder and delivering it to the bat-former in a light and fluffy state, substantially as set forth.

18. In a cotton-baling apparatus, the combination with a press for making cylindrical cotton-bales, a bat-former for making a substantially continuous sheet or bat which is fed to the press, a lint-flue through which the cotton is blown, and a condenser-cylinder in the lint-flue for separating the cotton from the air and for depositing the cotton in the bat-former, of an automatic feeder placed between the condenser-cylinder and the bat-former and having a feed-apron for removing the cotton therefrom, a gate or door arranged to be moved into the path of the cotton thrown off of the condenser-cylinder, whereby such cotton will accumulate in the automatic feeder, and a fan for removing the cotton from the automatic feeder and blowing it with an auxiliary blast to the condenser-cylinder, substantially as set forth.

19. In a cotton-baling apparatus, the combination with a press for making cylindrical cotton-bales, of a hopper mounted above the same, a pair of bat-forming rollers mounted in said hopper near its lower portion, means for depositing said cotton in the hopper in a light, fluffy state, a pair of compression-rollers mounted between the bat-forming rollers and the press, and means for driving the compression-rollers at a slower surface speed than the baling device of the press, substantially as set forth.

20. In a cotton-baling apparatus, the combination with a press for making cylindrical cotton-bales, of a hopper mounted above the same, a pair of bat-forming rollers mounted in said hopper near its lower portion, means for depositing said cotton in the hopper in a light, fluffy state, a pair of compression-rollers mounted between the bat-forming rollers and the press, means for driving the compression-rollers at a slower surface speed than the baling device of the press, and means for driving the bat-forming rollers at a slower surface speed than that of the compression-rollers, substantially as set forth.

This specification signed and witnessed this 24th day of March, 1900.

WILLIAM E. ANDERSON.

Witnesses:
L. BAN MORGAN,
P. M. JAMES.